United States Patent [19]
Fujii et al.

[11] Patent Number: 5,758,208
[45] Date of Patent: May 26, 1998

[54] IMAGING APPARATUS

[75] Inventors: Naoki Fujii, Hachioji; Koji Mizobuchi, Sagamihara, both of Japan

[73] Assignee: Olympus Optical Co., Ltd., Tokyo, Japan

[21] Appl. No.: 769,938

[22] Filed: Dec. 19, 1996

[30] Foreign Application Priority Data

Dec. 28, 1995 [JP] Japan ................................ 7-342893

[51] Int. Cl.$^6$ ........................................ G03B 5/00
[52] U.S. Cl. ................................ 396/87; 396/542
[58] Field of Search ........................ 396/87, 85, 72, 396/133, 89, 542, 529; 359/696, 697, 698, 694, 823, 824; 348/345, 347, 357, 358

[56] References Cited

FOREIGN PATENT DOCUMENTS

| | | |
|---|---|---|
| 62-100744 | 5/1987 | Japan . |
| 5-341370 | 12/1993 | Japan . |
| 6-21029 | 3/1994 | Japan . |
| 8-76212 | 3/1996 | Japan . |

*Primary Examiner*—W. B. Perkey
*Attorney, Agent, or Firm*—Louis Weinstein

[57] ABSTRACT

An imaging apparatus of the present invention comprises an elastically-deformative band-like flexible printed-circuit (FPC) board having one end thereof fixed to a lens holding frame 4 supported movably in an optical-axis direction O and capable of electrically connecting the main unit of the imaging apparatus with the lens holding frame, and an FPC board take-up mechanism for fixing and supporting the other end of the FPC board and applying a tension to the FPC board so that the FPC board will not loosen. The FPC board take-up mechanism feeds or winds the FPC board according to advancement or withdrawal of the lens holding frame. Using this apparatus, a space within a lens barrel to be occupied by the FPC board for electrically connecting the main unit with the lens holding frame can be minimized. Furthermore, the present invention can be implemented in an imaging apparatus in which a lens holding frame makes a long stroke.

35 Claims, 14 Drawing Sheets

IMAGING APPARATUS

BACKGROUND OF THE INVENTION

1. Field of the Invention

The present invention relates to a main unit of an imaging apparatus, or more particularly, to an imaging apparatus having a lens holding frame supported movably in an optical-axis direction.

2. Description of the Invention

In the past, a flexible printed-circuit board (hereinafter, a FPC board) has been adopted as a connecting means for absorbing a stroke made by a lens holding frame, which moves in an optical-axis direction during a power variation or focus operation of a camera, for the purpose of electrical connection between the lens holding frame and a main unit of an imaging apparatus that is a camera disclosed in Japanese Unexamined Utility Model Publication No. 61-206943 or a general camera.

The method in which one thing whose relative position in relation to another thing varies is connected to the another thing by utilizing the ability of an FPC board to elastically deform has the advantage that a circuit pattern can be formed on an FPC board in the same manner as on an ordinary rigid printed-circuit board.

For placing an elastically-deformative FPC board in a limited space within a lens barrel, it is necessary to minimize a space occupied by an FPC board while efficiently preventing the FPC board from interfering with any other member as shown in a longitudinal sectional view of FIG. 26 showing the wide-angle and telephoto states of a camera and in a longitudinal sectional view of FIG. 27 showing a state in which focus lenses are thrust with the camera set in the wide-angle state. In some cameras, therefore, such a measure is taken that an FPC board position control means that moves together with a lens barrel is located on a bend of an FPC board 103 in a general arrangement.

The FPC board 103 in a camera shown in FIG. 26 electrically connect a CPU 104 incorporated in a main unit 101 of an imaging apparatus and a lens holding frame 102 that advances or withdraws. A battery 105 is placed under the CPU 104 in the camera shown in FIG. 26. Moreover, a drive motor 106 for driving the lens frame for advancement or withdrawal is placed above the main unit.

An FPC board used as a connecting means in a camera disclosed in the Japanese Unexamined Patent Publication No. 61-206943 adopts a structure in which a stroke made by a lens holding frame is absorbed owing to the elastic deformation of a bend of an FPC board. However, the stroke made by a lens holding frame has become longer due to the employment of a higher-power zoom lens in recent years. Besides, more and more cameras are adopting a lens barrel having a multistage thrust structure for the purpose of realizing a camera that becomes compact when the lens barrel is stowed.

In the case of a camera adopting the multistage thrust structure permitting a long stroke, an FPC board is required to have a plurality of bends for respective lens barrels that change the relative position in an optical-axis direction of the lens barrel along with the thrust or withdrawal of lenses. The lens barrel unit is therefore made large in order to ensure a space for the bends of the FPC board. Moreover, there arises a problem that the structure of the lens barrel unit becomes complex because it must be guaranteed that a plurality of parts of the FPC board can stretch or contract stably.

In a camera disclosed in Japanese Unexamined Patent Publication No. 62-100744, a plurality of segments each having two kinds of reflectances; a large and small reflectances are placed on a plane opposed to a camera body on the side of a photography lens in order to transmit information of the photography lens to the camera body. A photoreflector having a light-emitting device and light-receiving device is placed in the camera body for each of the segments. In this camera, no electrical connection means is employed owing to the above structure but a binary signal whose value corresponds to either of the large and small reflectances of each segment can be transmitted from the photography lens to the camera body.

In the case of the camera disclosed in the Japanese Unexamined Patent Publication No. 62-100744, no problem occurs as long as information inherent to the photography lens is transmitted to the camera body. However, for example, when an attempt is made to transmit a change in state of the photography lens as information to the camera body, if the reflectances of each segment are fixed, it is impossible to transmit the change. The reflectances of each segment are required to be variable. In this case, the segments become considerably expensive.

No problem occurs as long as information is transmitted in order to judge the type of a lens. However, for example, when an attempt is made to transmit a lot of information for controlling drive of a focus lens or controlling drive of a shutter, there arises a problem that the number of segments as well as the numbers of corresponding light-emitting devices and light-receiving devices increase, a required space expands, and cost increases.

In a camera disclosed in Japanese Unexamined Patent Publication No. 5-341370, a light-emitting device or light-receiving device is placed in each of a lens barrel, which is inserted into a mount of a camera body and movable in an optical-axis direction relative to the mount, and the camera body. Signals can be transmitted between the camera body and lens barrel.

In the case of the camera disclosed in the Japanese Unexamined Patent Publication No. 5-341370, signal transmission between the lens barrel and camera body is achieved through communication. A separate electrical connection means for supplying power to the lens barrel becomes necessary. Even in this case, electrical connection is achieved while a stroke of a relative movement made by the lens barrel in relation to the camera body is absorbed. When the stroke gets larger, therefore, a structural problem occurs.

When the structure is adapted to a zoom lens barrel for which a focus operation is needed, it becomes necessary to move some lenses in an optical-axis direction inside a lens barrel that makes a relative movement in relation to a camera body. Another line routing must therefore be performed within the lens barrel.

In an imaging apparatus disclosed in Japanese Unexamined Patent Publication No. 8-76212 filed by the present applicant, a sub-battery is incorporated in a lens holding frame in order to obviate the necessity of supplying power from a main unit of the imaging apparatus to the lens holding frame on a steady basis. A non-contact type communication means is used for signal transmission, whereby a steady electrical connection means for connecting the main unit of the imaging apparatus and the lens holding frame becomes unnecessary.

The imaging apparatus disclosed in the Japanese Unexamined Patent Publication No. 8-76212 is advantageous to a high-power zoom lens, for which a lens holding frame makes a long stroke, because the steady electrical connection for connecting the main unit of the imaging apparatus with the lens holding frame is not required at all. However, since electrical elements such as a sub-battery, sub-CPU, and actuator driving IC must be incorporated in the lens holding frame, an increase in cost and in size of the lens barrel is unavoidable.

An FPC board stowage mechanism for a camera, which is disclosed in Japanese Unexamined Utility Model Publication No. 6-21029, is such that a line-connection FPC board movable within a camera is wound by a rotary arm located in a camera body and rotors placed in the distal part of the rotary arm so that the rotors can rotate freely.

However, in the FPC board stowage mechanism disclosed in the Japanese Unexamined Utility Model Publication No. 6-21029, the FPC board fixed to an electrical substrate outside the rotary arm is taken up by the rotary arm having two rotors beyond a movable lens fixing unit.

In this case, the FPC board is taken up after being wound by two turns about the distal part of the part having a smaller diameter. This causes greater sliding friction to occur between the distal part of the arm and the FPC board. For better movements, therefore, at least two rotors supported freely rotatably by the distal part of the arm are indispensable. For this reason, there are limitations in designing the stowage mechanism compactly. Moreover, the number of parts including rotors and auxiliary plates increases. An increase in cost is unavoidable.

OBJECTS AND SUMMARY OF THE INVENTION

The present invention attempts to overcome the foregoing drawbacks. One object of the present invention is to provide a low-cost imaging apparatus making it possible to minimize a space in a lens barrel occupied by a connection means for connecting a main unit of the imaging apparatus with a lens holding frame, and being adaptable to a lens holding frame that makes a long stroke.

Another object of the present invention is to provide an imaging apparatus making it possible to adopt a means having a pattern for use in detecting a position, to which a movement is made, as a connection means for connecting a main unit of the imaging apparatus with a lens holding frame, to reduce a space occupied by a position detecting means for the position detection, and to detect the position with high accuracy.

A first imaging apparatus of the present invention comprises a main unit, a lens holding frame freely movable in an optical-axis direction relative to the main unit, a connection means for connecting the main unit with the lens holding frame, a take-up means for taking up the connection means so as to eliminate looseness, and a constraining means for constantly constraining the take-up means to move in a direction in which the connection means is taken up.

In the first imaging apparatus, the lens holding frame and main unit are mutually connected by the connection means irrespective of the relative position in an optical-axis direction of the lens holding frame in relation to the main unit with a minimum length between them without looseness. The connection means is located at a given position within the main unit in such a way that the connection means will not adversely affect optical performance.

A second imaging apparatus of the present invention comprises a main unit, a lens holding frame freely movable in an optical-axis direction relative to the main unit, a control circuit incorporated in the main unit, electrical parts installed in the lens holding unit, a connection means, placed to extend in the optical-axis direction, for electrically connecting the control circuit with the electrical parts, a detection pattern formed at at least one end of at least one side of the connection means, and a detecting means for detecting the magnitude of a movement made parallel to the optical-axial direction by the connection means according to the detection pattern.

In the second imaging apparatus, the electrical parts in the lens holding frame and the control circuit in the main unit are mutually electrically connected by the connection means. The detection pattern formed on the connection means is detected by the detecting means, whereby the magnitude of a movement made by the lens holding frame is detected.

Other features and advantages of the present invention will be fully apparent from the description below.

Figure 1:
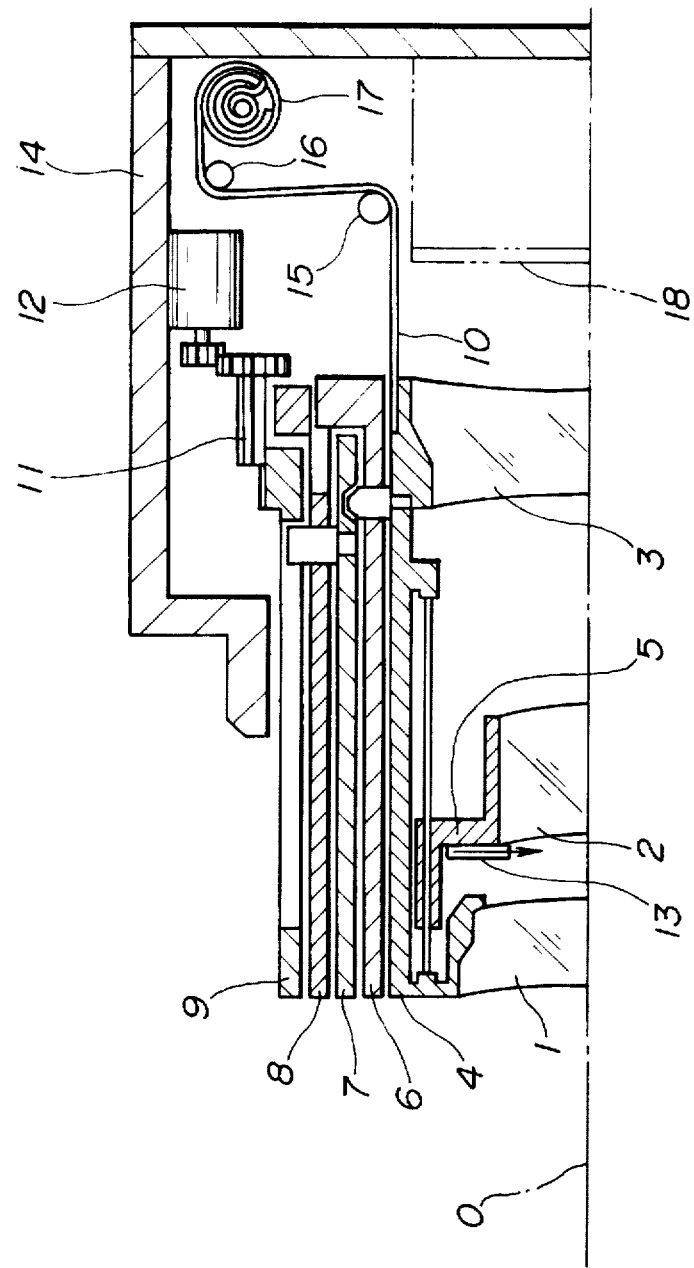
FIG. 1 is a longitudinal sectional view of a major portion of a mechanism with a camera that is an imaging apparatus of a first embodiment of the present invention set in a wide-angle state.
Figure 14:
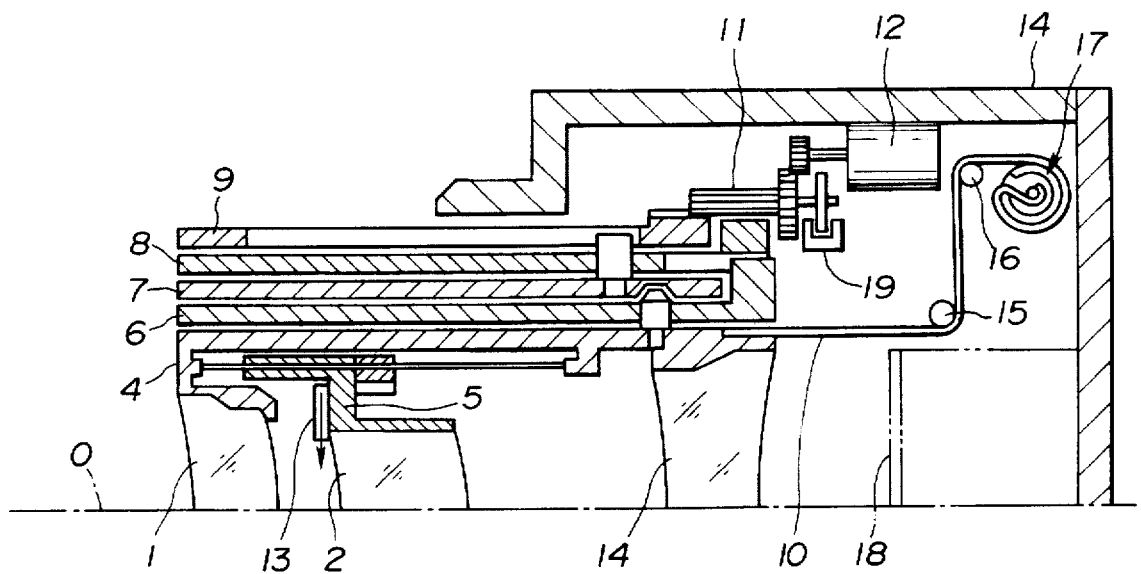
Figure 15:
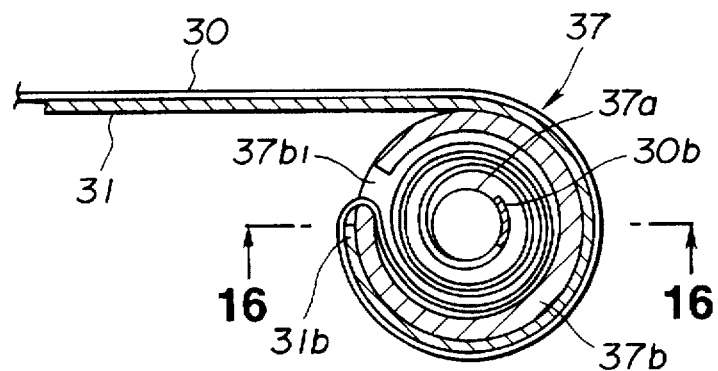
Figure 16:
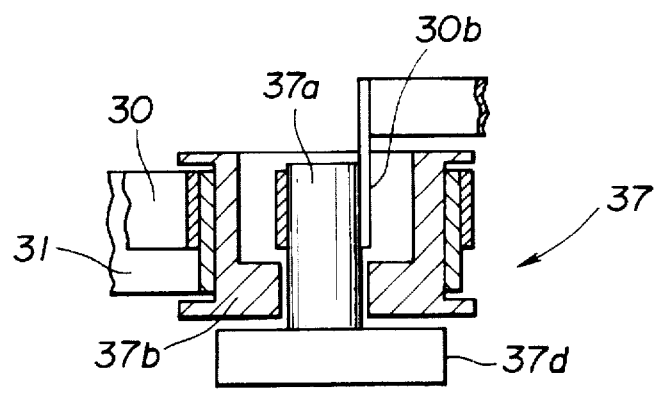
Figure 17:
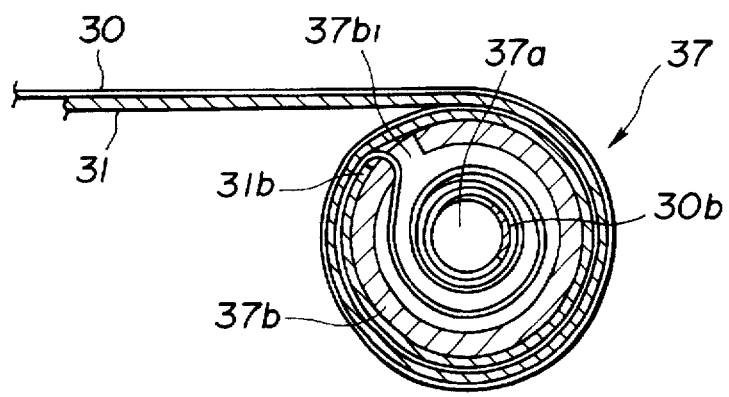
Figure 18:
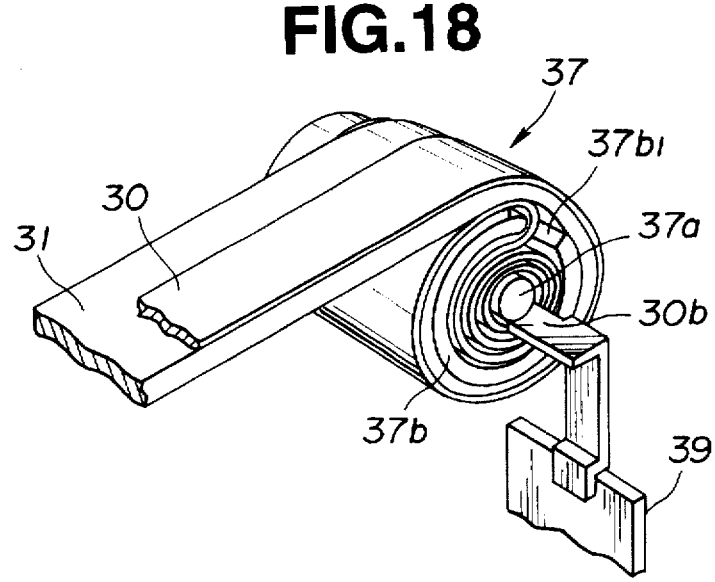
Figure 19:
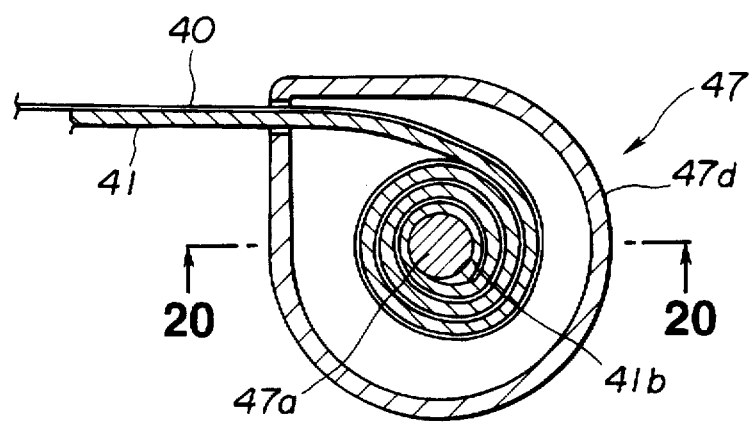
Figure 20:
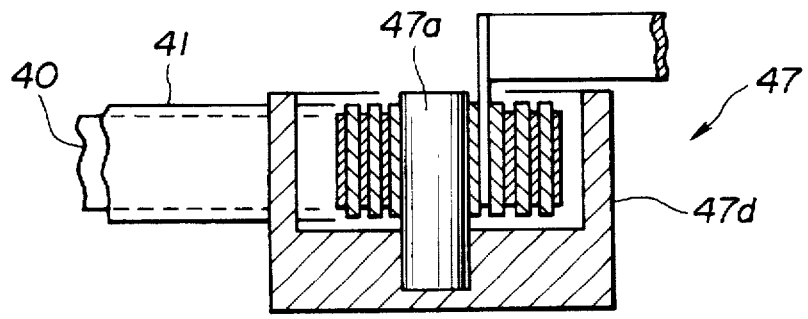
Figure 21:
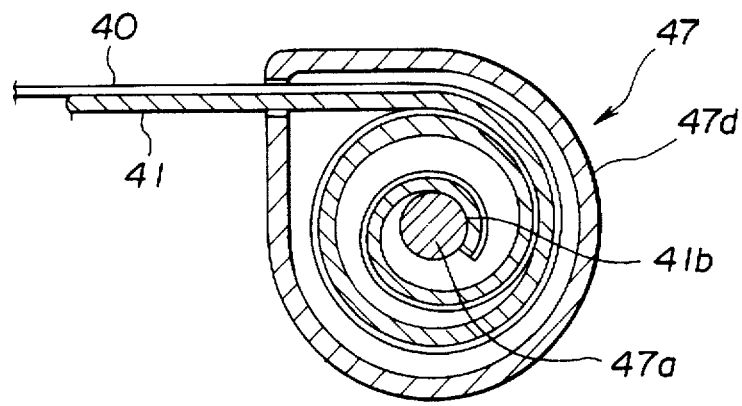
Figure 22:
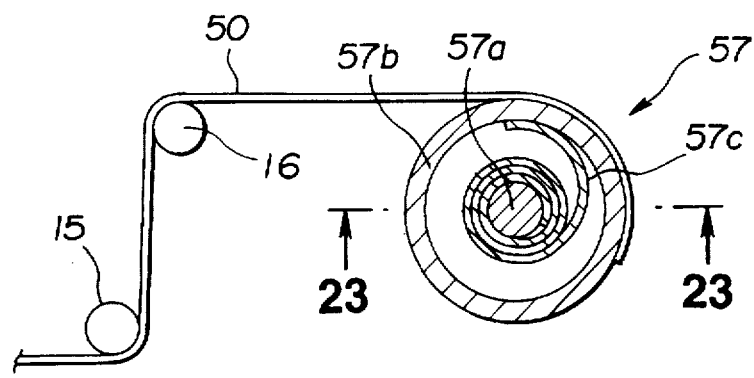
Figure 23:
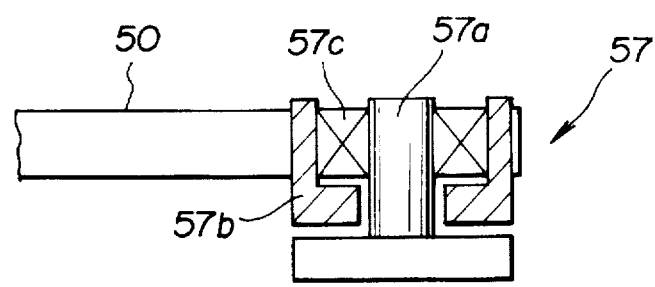
Figure 24:
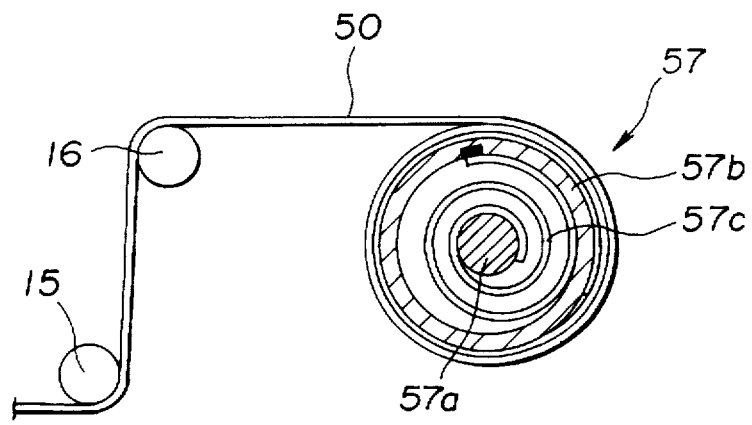
Figure 25:
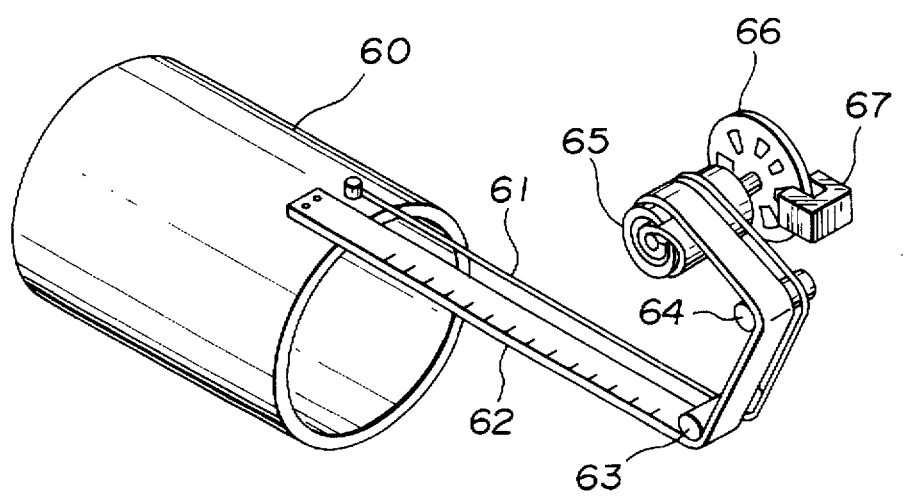
Figure 26:
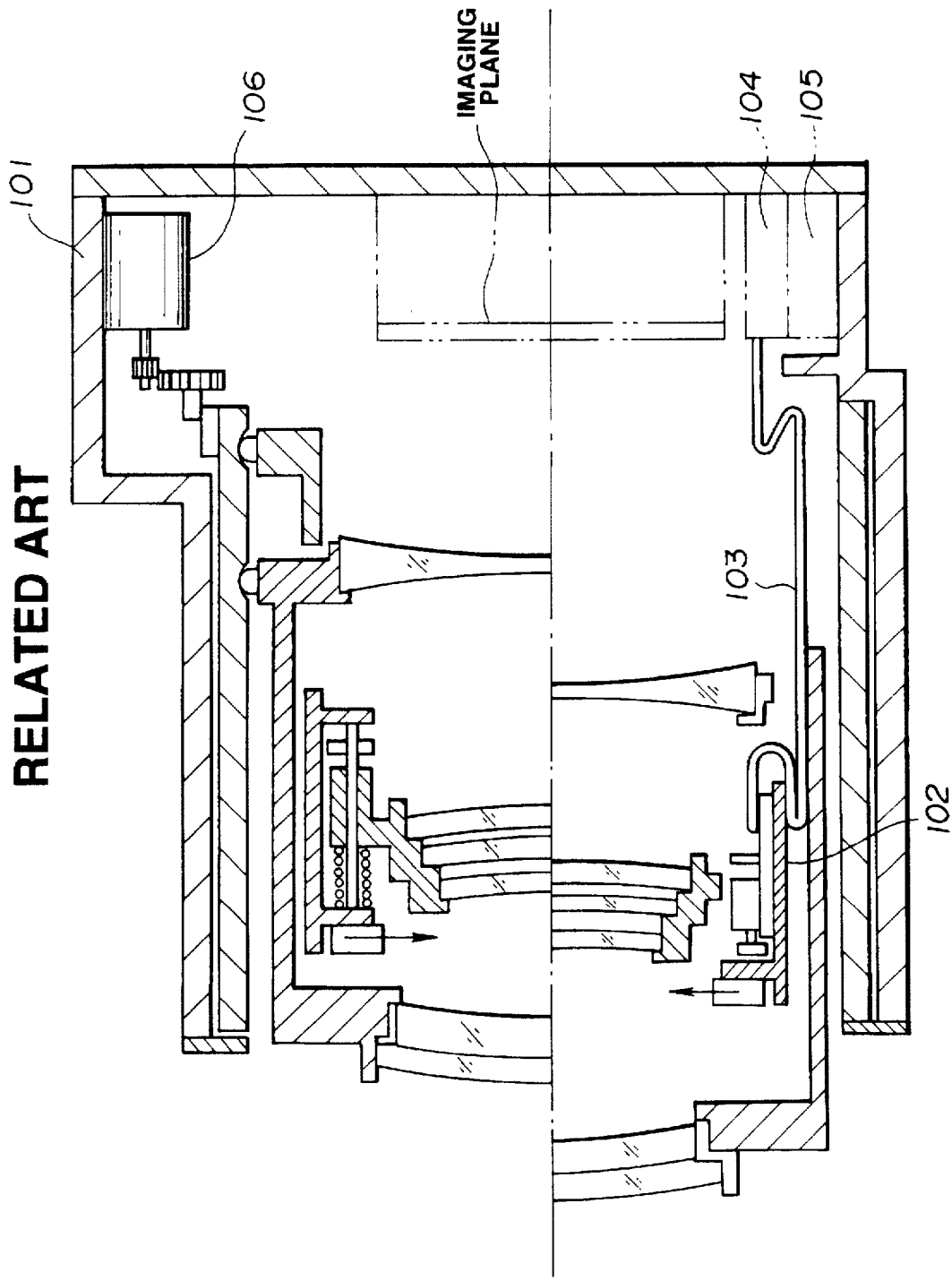
Figure 27:
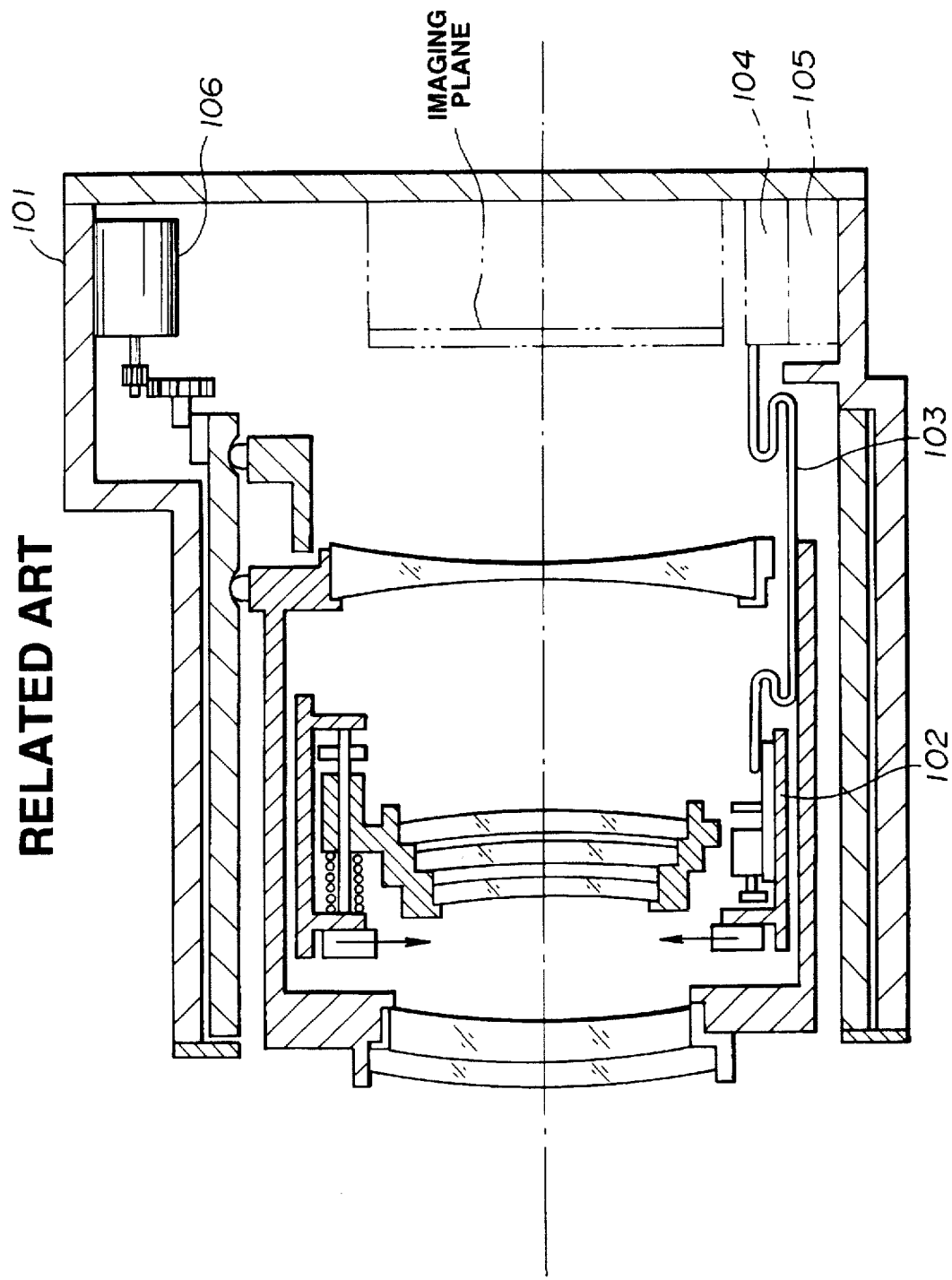

13A, illustrating the relative state of the encoder pattern on the FPC board in relation to the photointerrupter at yet another position at which the lens holding frame is actuated;

FIG. 14 is a longitudinal sectional view of yet another variant of the camera shown in FIG. 1;

FIG. 15 is a cross sectional view of a state in which a band-like FPC board is pulled out of an FPC board take-up mechanism incorporated in a camera of a second embodiment of the present invention;

FIG. 16 shows a 16—16 section of FIG. 15;

FIG. 17 is a cross sectional view of a state in which the band-like FPC board is wound about the FPC board take-up mechanism incorporated in the camera shown in FIG. 15;

FIG. 18 is an oblique view showing the connected state of the FPC board take-up mechanism to an electrical printed-circuit board in the camera shown in FIG. 15;

FIG. 19 is a cross sectional view of an FPC board take-up mechanism incorporated in a camera of a third embodiment of the present invention, showing a state in which an FPC board is pulled out;

FIG. 20 shows a 20—20 section of FIG. 19;

FIG. 21 is a cross sectional view of the FPC board take-up mechanism incorporated in the camera shown in FIG. 19, showing a state in which the FPC board is wound;

FIG. 22 is a cross sectional view of an FPC board take-up mechanism incorporated in a camera of a fourth embodiment of the present invention, showing a state in which an FPC board is pulled out;

FIG. 23 shows a 23—23 section of FIG. 22;

FIG. 24 is a cross sectional view of the FPC board take-up mechanism incorporated in the camera shown in FIG. 22, showing a state in which the FPC board is wound;

FIG. 25 is an oblique view showing a state in which yet another variant of the FPC board take-up mechanism incorporated in the camera shown in FIG. 1 is mounted in a lens holding frame;

FIG. 26 is a longitudinal sectional view showing a camera of a prior art in a wide-angle or telephoto state; and FIG. 27 is a longitudinal sectional view showing a state in which focus lenses are thrust with the camera of the prior art set in the wide-angle state.

DESCRIPTION OF THE PREFERRED EMBODIMENTS

Embodiments of the present invention will be described in conjunction with the drawings below.

Figure 2:
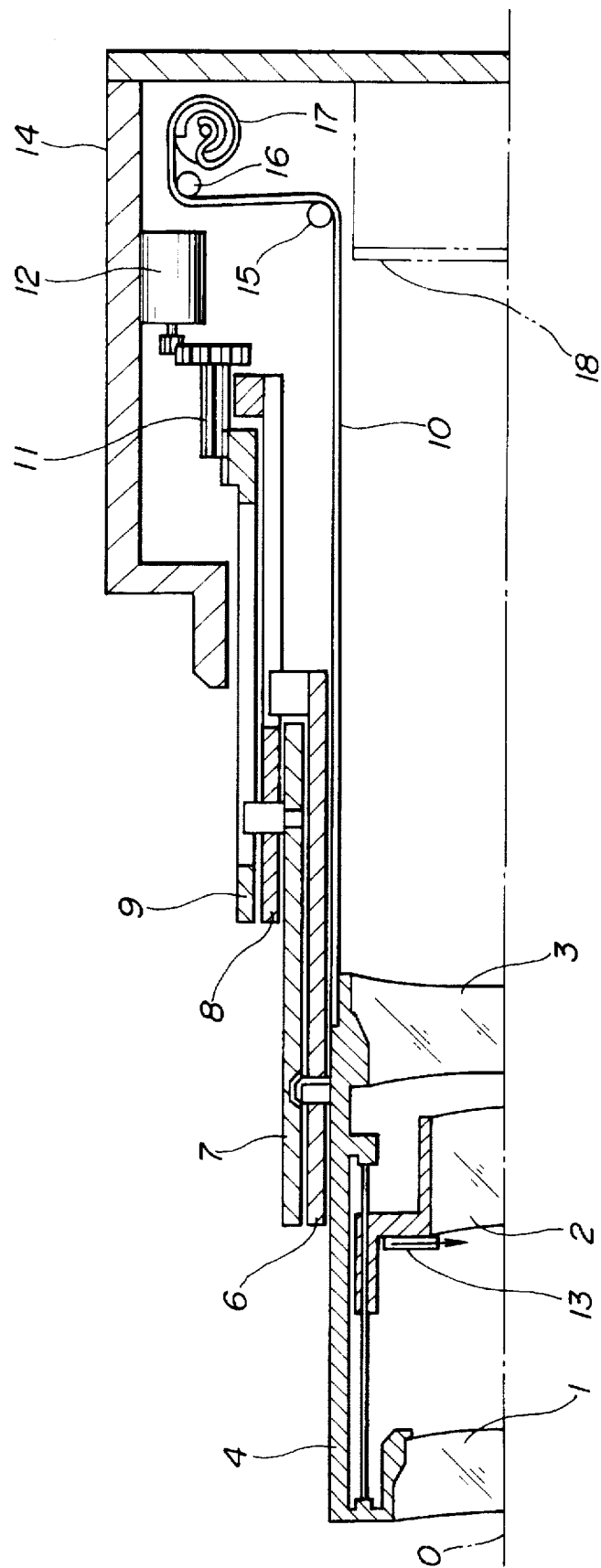
FIG. 2 is a longitudinal sectional view of the major portion of the mechanism with the camera shown in FIG. 1 set in a telephoto state.

FIGS. 1 and 2 are longitudinal sectional views showing the major portion of a mechanism in a camera that is an imaging apparatus of the first embodiment of the present invention. FIG. 1 shows a section of the mechanism with the camera set in a wide-angle state, and FIG. 2 shows it with the camera set in a telephoto state.

A photography lens of the camera of this embodiment is composed of a first group of lenses 1, second group of lenses 2, and third group of lenses 3. The first and third groups of lenses 1 and 3 are held in a common lens holding frame 4, and advanced or withdrawn in one united body in an optical-axis direction along with a power variation operation. The second group of lenses 2 is supported by a lens holding frame 5 within the lens holding frame 4 so that it can make a relative movement in the optical-axis direction in relation to the first group of lenses 1 and the third group of lenses 3.

A lock frame 8 is locked in and supported by a camera body 14 that is a main unit of the imaging apparatus. A rotary frame 9 and cam ring 7 are fitted on the outer circumference of the lock frame 8 and on the inner circumference thereof respectively so that they can rotate freely. A guide frame 6 is fitted on the inner circumference of the cam ring 7 so that it can slide freely, and the lens holding frame 4 is fitted on the inner circumference of the guide frame 6 so that it can slide freely.

When the rotary frame 9 is rotated by a zoom drive motor 12, which is fixed and supported, via a zoom driving force conveyer 11, the cam ring 7 that is interlocked with the rotary frame 9 rotates.

A cam follower of the cam ring 7 is engaged with a cam groove dug on the lock frame 8. The cam ring 7 is driven to advance or withdraw in the optical-axis direction according to the shape of the cam groove on the lock frame 8 while rotating.

The lens holding frame 4 has a cam follower thereof engaged with a cam groove dug on the inner circumference of the cam ring 7, and is guided to move rectilinearly-by the guide frame 6 that is guided to move rectilinearly by the lock frame 8.

When the cam ring 7 rotates, the lens holding frame 4 is driven to advance or withdraw in the optical-axis direction relative to the cam ring 7 according to the shape of the cam groove on the cam ring 7. However, the guide frame 6 is structured to be interlocked with the cam ring 7 in the optical-axis direction alone.

When the zoom drive motor 12 is driven, therefore, the lens holding frame 4 is driven to advance or withdraw in the optical-axis direction relative to the cam ring 7. This allows the first group of lenses 1, second group of lenses 2, and third group of lenses 3 to move by a long stroke in two steps with respect to an imaging plane 18.

In the camera of this embodiment, a lens barrel for driving power-variation lenses in two steps is adopted. If the employment of a lens barrel for high power-variation lenses makes it necessary to drive the lenses by a large stroke, advancement and withdrawal should merely be driven in three or more steps. Consequently, the length of the lens barrel can be reduced and a camera can be compactly designed.

For exerting the effect of varying the power of the photography lens having the foregoing components of the camera of this embodiment, the lens holding frame 5 for holding the second group of lenses 2 must be driven to advance or withdraw within the lens holding frame 4 along with the movement in the optical-axis direction of the lens holding frame 4 in order to change the relative position of the second group of lenses 2 in relation to the first group of lenses 1 and third group of lenses 3.

The lens holding frame 5 is supported by a feed screw so that it can move in the optical-axis direction within the lens holding frame 4. A lens holding frame 5 drive motor, which is not shown, locked in the lens holding frame 4 is used to rotate the feed screw independently of the zoom drive motor, whereby the position in the optical-axis direction of the lens holding frame 5 can be controlled. The lens holding frame 5 is moved in the optical-axis direction by a given magnitude according to the magnitude of a change in position of the lens holding frame 4 deriving from power variation, whereby a power variation operation is carried out.

With the position in the optical-axis direction of the lens holding frame 4 held constant, the position of the lens holding frame 5 alone is changed by the lens holding frame 5 drive motor that is also used for power variation. Thus, a focus operation is carried out.

A shutter mechanism 13 is fixed to the lens holding frame 5 in one united body, and driven by a driving actuator and driving force conveyer mechanism which are fixed to the lens holding frame 5 in one united body.

For carrying out a power-variation operation, focus operation, and exposure operation during photography, it is necessary to actuate the lens holding frame 5 drive motor in the lens holding frame 4, a position detection sensor for controlling the drive motor, a shutter driving actuator in the lens holding frame 5, and a position detection sensor for controlling the actuator.

For supplying power from the camera body in which electrical circuits including a battery and CPU are installed, transmitting driving data based on range-finding and photometric information, and transmitting information of a mechanically driven state from the lens barrel, a band-like FPC board 10 is used as an electrical connection means for connecting the camera body with the lens barrel.

The band-like FPC board 10 has one end thereof on the side of the lens barrel fixed to the lens holding frame 4. With the end thereof fixed, the FPC board is further extended and connected to the actuator and sensor in the lens holding frame 4 and to the actuator and sensor in the lens holding frame 5.

The other end of the FPC board 10 is routed by a guide shaft 15 and guide shaft 16 serving as guide means, and linked to an FPC board take-up mechanism 17 serving as a take-up means. The fixed end 10b of the FPC board 10 is further extended from the FPC board take-up mechanism 17 and is linked to an electrical printed-circuit board 19 in the camera body 14 (See FIG. 6).

The FPC board take-up mechanism 17 always exerts a spring force for pulling the FPC board 10 and constraining it to move in a direction in which the FPC board is taken up. Thus, the FPC board take-up mechanism 17 functions to prevent the FPC board from loosening with advancement or withdrawal of the lens holding frame A4.

The junctions of the FPC board 10 with an actuator and sensor located beyond an area in the lens holding frame 4 in which the FPC board is fixed to the lens holding frame 4 are required to absorb a change in relative position of the lens holding frame 4 in relation to the lens holding frame 5 and to thus maintain electrical connection. The change in relative position is negligible even in comparison with a change in relative position of the lens holding frame 4 in relation to the camera body occurring during power variation. The change in relative position is absorbed relatively readily by bending and thus deforming the FPC board owing to the ability of the FPC board to elastically deform in the same manner as it is in a conventional camera.

When the lens holding frame 4 is plunged into the camera body 14 as part of a power variation operation, that is, when the power of the photography lens is varied from a telephoto-mode power to a wide-angle mode power, as shown in FIG. 1, the FPC board 10 is taken up by the FPC board take-up mechanism 17 according to the power variation operation. The FPC board is always retained in a highly-tensed (i.e. taut) state without looseness between the lens holding frame A4 and FPC board take-up mechanism 17.

When the lens holding frame 4 is thrust out of the camera body as part of a power variation operation, that is, when the power of the photography lens is changed from the wide-angle mode power to the telephoto-mode power, as shown in FIG. 2, the FPC board 10 is pulled out against the take-up force of the FPC board take-up mechanism 17, and retained in a tensed state without looseness.

Irrespective of a position to which a movement is made for power variation, the FPC board 10 in the lens barrel is always routed and positioned between the lens holding frame 4 and the guide shaft 15 to which both ends thereof are fixed. The route is separated by a given distance from effective rays passing through the photography lens, whereby the adverse influence of the FPC board 10 upon the optical performance of the camera can be readily eliminated.

For example, when a 35-mm silver halide film is used, assuming that a rectangle of 24 by 36 mm in size is defined on the imaging plane 18, if the FPC board 10 is routed on the side of a shorter side of the rectangle, the route is separated from the effective rays passing through the photography lens within a given space. This is advantageous in terms of optical performance.

The lens holding frame 4 always receives the take-up constraining force of the FPC board take-up mechanism 17 and is thus constrained to move toward the imaging plane in the optical-axis direction. The constraining force causes the backlash between the cam follower on the lens holding frame 4 and the cam groove on the cam ring 7 and between the cam follower on the cam ring 7 and the cam groove on the lock frame 8 to become one-sided. Moreover, the backlash present in the driving force conveyer 11 is pushed aside. Consequently, the accuracy in controlling the position of the photography lens can be improved.

Next, the details of the structure of the FPC board take-up mechanism 17 will be described in conjunction with FIGS. 3, 4, and 5.

Figure 3:
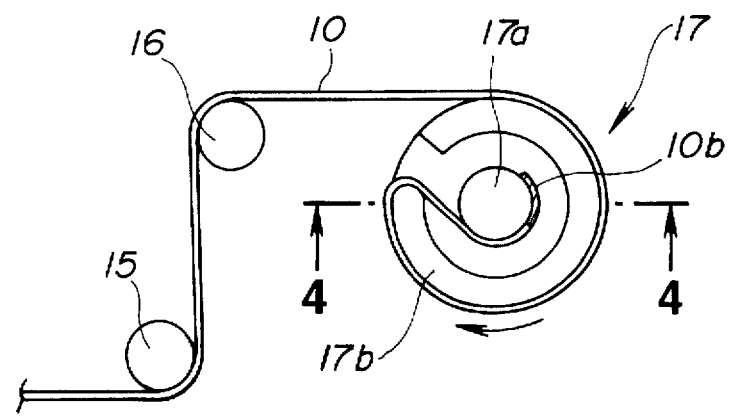
FIG. 3 is a plan view of a state in which a band-like FPC board is pulled out of an FPC board take-up mechanism in the camera shown in FIG. 1.
Figure 4:
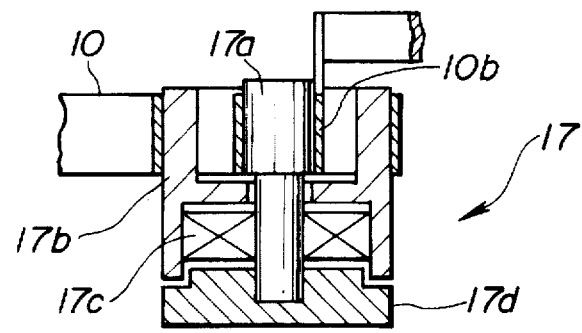
FIG. 4 shows a 4—4 section of FIG. 3.

FIG. 3 is a plan view of a state in which the FPC board 10 is pulled out, and FIG. 4 shows a 4—4 section of FIG. 3. In the FPC board take-up mechanism 17, the fixed end 10b of the FPC board 10 on the side of the camera body is fixed to a center fixing shaft 17a supported in one united body by a support 17d locked in the camera body 14.

A wind reel 17b is attached to the center fixing shaft 17a so that the wind reed 17b can rotate freely. A spiral spring 17c serving as a constraining means is wound about the center fixing shaft 17a, and suspended between the wind reel 17b and center fixing shaft 17a. A constraining force for constraining the wind reel 17b to rotate about the center fixing shaft 17a clockwise in FIG. 3 is constantly applied to the wind reel 17b.

When the photography lens is set at a telephoto-mode position for zoom, and the FPC board 10 shown in FIG. 3 is pulled out to the greatest extent, if the power of the photography lens is varied to a wide-angle mode power, the lens holding frame 4 approaches the camera body. The FPC board 10 is then wound about the circumference of the center fixing shaft 17a of the FPC board take-up mechanism 17 and the outer circumference of the take-up reel 17b thereof by a length corresponding to the approach of the lens holding frame 4.

Figure 5:
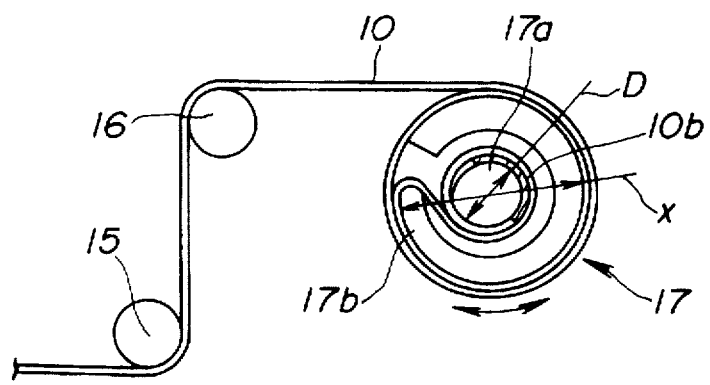
FIG. 5 is a plan view of a state in which the band-like FPC board is wound by one turn about the FPC board take-up mechanism in the camera shown in FIG. 1.

FIG. 5 shows a state in which the wind reel 17b in the state shown in FIG. 3 has rotated clockwise and taken up the FPC board 10 by one turn. The magnitude L of taking up the FPC board corresponds to the magnitude of a movement made by the lens holding frame 4, wherein the following expression is constructed:

$$L = \pi D + \pi x \qquad (1)$$

where D denotes the diameter of the center fixing shaft, and x denotes the diameter of the reel.

The FPC board 10 is, as mentioned above, taken up by the constraining force causing a rotation when the lens holding frame is plunged. When the lens holding frame is thrust, the FPC board 10 is pulled out against the rotation constraining force. The FPC board 10 remains tensed all the time between the lens holding frame 4 and center fixing shaft 17a without coming loose.

Figure 6:
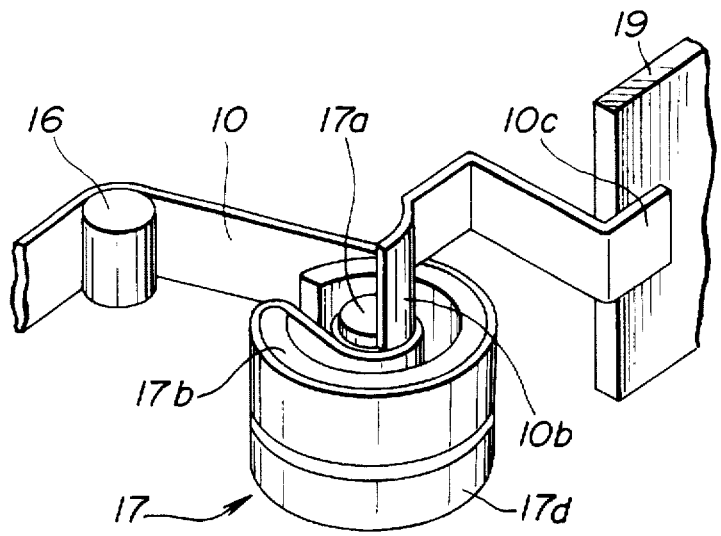
FIG. 6 is an oblique view showing the connected state of the FPC board linking the FPC board take-up mechanism with an electrical printed-circuit board within a camera body in the camera shown in FIG. 1.

FIG. 6 is an oblique view showing a connected state of the FPC board in which the FPC board is linking the FPC board take-up mechanism 17 with the electrical printed-circuit board 19 in the camera body.

The FPC board take-up mechanism 17 takes up or feeds the FPC board 10 according to a change in position of the lens holding frame 4. Despite the movement of the FPC board take-up mechanism 17, the fixed end 10b of the FPC board 10 on the side of the camera body is attached and fixed to the stationary center fixing shaft 17a in the camera body 14. The fixed end 10b of the FPC board is further extended and a contact section 10c thereof is linked to the electrical printed-circuit board 19 on which an electrical control circuit and other circuits for the camera body 14 are mounted.

In the camera of this embodiment having the foregoing structure, the photography lens is zoomed in or out during photography, and the lens holding fame 4 is advanced or withdrawn from a wide-angle mode position to a telephoto-mode position or vice versa accordingly. Nevertheless, the FPC board take-up mechanism 17 having the spiral spring 17c therein takes up or feeds the band-like FPC board 10 designed for electrical connection in such a way that the FPC board will not loosen. The FPC board 10 is connected directly to the electrical circuits in the camera body 14 by way of the fixed part thereof fixed to the center fixing shaft 17a.

Consequently, the band-like FPC board 10 for electrical connection can be stowed space-efficiently in a limited space, in which the FPC board 10 will not affect the optical system, without the necessity of a space for bending the FPC board which is needed in a conventional camera.

Moreover, since a constraining force exerted by the FPC take-up mechanism 17 to take up the FPC board always works on the FPC board 10 between the camera body 14 and lens holding frame 4, the FPC take-up mechanism 17 is driven with all backlash present in the engagement sections of the components located between the lock frame 8 and lens holding frame 4 held one-sided with respect to the optical axis. This results in highly accurate drive control for advancement and withdrawal.

For connecting the camera body 14 with the lens holding frame 4, few restrictions are imposed on the structure of a lens barrel. Even for a lens barrel in which a lens holding frame is moved by a large magnitude along with a power variation operation, the structure of the lens barrel will not become complex.

In the camera of the first embodiment, the constraining means for generating a torque for the center shaft and take-up shaft is not limited to the spiral spring 17c. Alternatively, a torsion spring will do.

Figure 7:
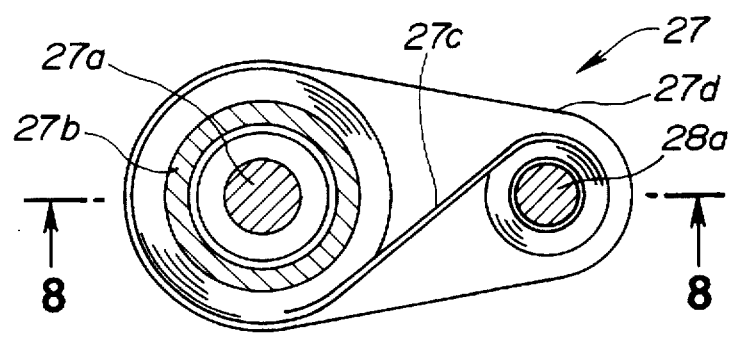
FIG. 7 is a cross-sectional view of a variant of the FPC board take-up mechanism in the camera shown in FIG. 1.
Figure 8:
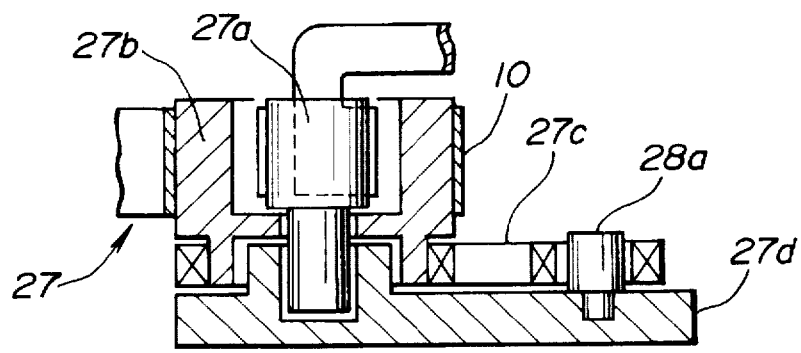
FIG. 8 shows an 8-8 section of FIG. 7.

As shown in the cross sectional view of FIG. 7 and the 8—8 section of FIG. 7 shown in FIG. 8, an FPC board take-up mechanism 27 that adopts a constant force spiral spring 27c opposite ends of which are wound about a take-up reel 27b and a constant force spiral spring shaft 28a having a smaller diameter than the take-up reel 27b in order to generate a constant torque for a center fixing shaft 27a and the take-up reel 27b can be proposed as a variant of the take-up mechanism.

A camera that adopts a band-like FPC board having an encoder pattern that is a detection pattern so as to detect the position of a lens holding frame can be proposed as a camera of a variant of the camera of the first embodiment. In this camera of the variant, a photointerrupter 21 (See FIG. 9) serving as a position detecting means is placed on a route of taking up the band-like FPC board, and a holding frame position meter for detecting the relative position of the lens holding frame 4 in relation to the camera body 14 on the basis of the output of the photointerrupter is incorporated.

Figure 9:
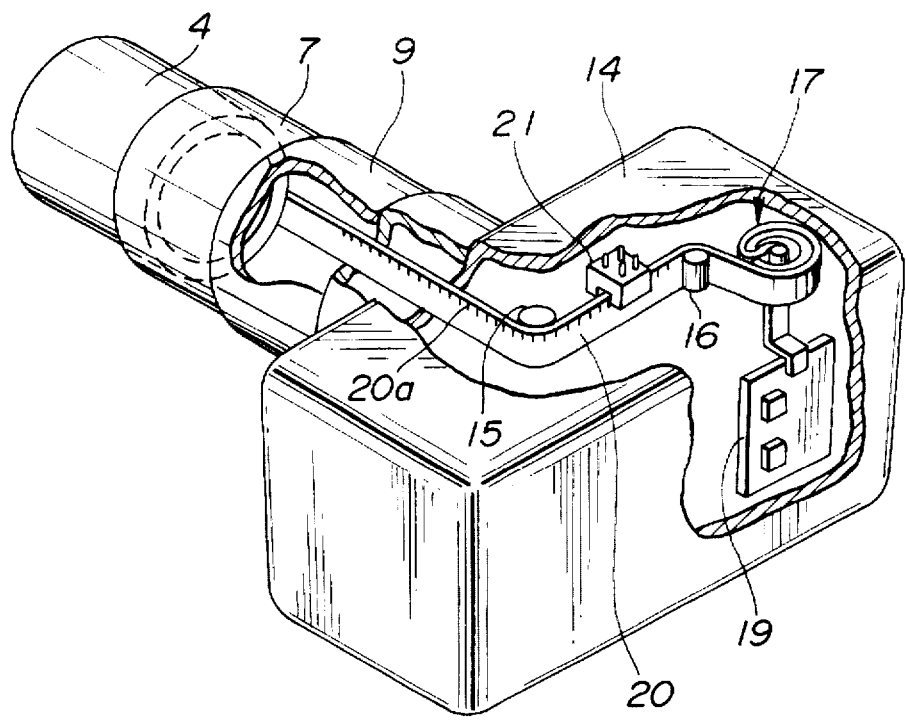
FIG. 9 is a perspective view of a camera adopting a band-like FPC board that has an encoder pattern thereon, that is, a variant of the camera shown in FIG. 1.

FIG. 9 is a perspective view of the camera of the variant having a band-like FPC board 20 having an encoder pattern 20a formed thereon. In this drawing, component members identical to those in the camera of the first embodiment are assigned the same reference numerals.

In the camera of the variant shown in FIG. 9, looseness of the FPC board 20 is eliminated by a take-up constraining force exerted by the FPC take-up mechanism 17 which is adapted to the first embodiment. Moreover, a backlash present in the coupling or engagement section between a frame member linking the lens holding frame 4 with the main unit 14, and the zoom driving force conveyer 11 (See FIG. 1) can also be eliminated.

The relative position in the optical-axis direction of the lens holding frame 4 in relation to the imaging plane 18 in the main unit 14 is detected accurately by detecting the magnitude of a movement made by the FPC board 20 deprived of the looseness by the take-up constraining force. Consequently, focus performance as well as imaging performance improves. Since the encoder pattern 20a can be formed in the same process as a conducting pattern that is basically formed on the FPC board 20 for electrical connection, this variant is advantageous cost-wise.

Next, the shape of the FPC board 20 will be described in conjunction with FIG. 10 and others.

The FPC board 20 is also used for electrical connection between an actuator and sensor in the lens barrel and the camera body as it is in the prior art. The lens holding frame 4 itself advances or withdraws in the optical-axis direction according to a power variation operation. An FPC board is therefore requested to have a sufficient mechanical strength. Normally, a single-sided FPC board that is highly resistive to folding and bending should be employed.

A single-sided FPC board itself has such a reinforced structure that a copper foil (of 18 to 35 micrometers thick) is coated over a base film (of 12.5 to 25 micrometers thick), and a cover film (of 12.5 to 25 micrometers thick) is attached to the copper foil using an adhesive. The copper foil can be laid out freely according to required specifications including the number of patterns of signal lines for electrical connection and the width of each pattern.

Figure 10:
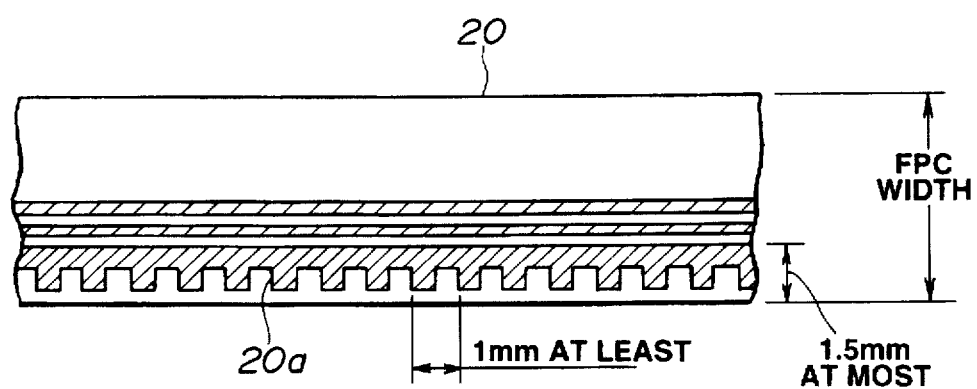
FIG. 10 is an enlarged view of the band-like FPC board having an encoder pattern thereon which is adapted to the camera shown in FIG. 9.

FIG. 10 is an enlarged view of the encoder pattern 20a, which is one of components of an incremental encoder, formed on the FPC board 20. As illustrated, among a plurality of patterns formed on the FPC board 20, a pattern extended straightforward in the optical-axis direction and made by etching the FPC board in the form of comb-teeth on the margin of the FPC board is the encoder pattern 20a that is an optical detection pattern.

Figure 11:
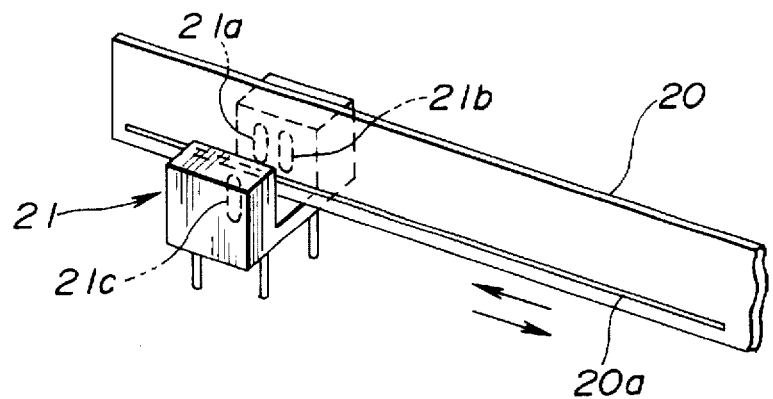
FIG. 11 is an oblique view showing the arrangement of a photointerrupter and an FPC board in the camera shown in FIG. 9.

As shown in FIGS. 9 and 11, the encoder pattern 20a is placed orthogonally to the optical-axis direction of the transparent two-phase photointerrupter 21 serving as a position detecting means locked in the camera body 14. In this state, when a power variation operation is carried out, the FPC board 20 itself that is interlocked with the lens holding frame 4 advances or withdraws in the optical-axis direction. At this time, the transparent two-phase photointerrupter 21 generates two output voltages (A and B) as expressed in the output waveform diagram of FIG. 12.

The two-phase type transparent photointerrupter 21 shown in FIG. 11 includes one light-emitter 21c, an output A light receiver 21a, and an output B light receiver 21b. The photointerrupter 21 is a mere example. Alternatively, two one-phase type transparent interrupters may be used in combination.

The numerical values indicating dimensions concerning the FPC board 20 in FIG. 10 are mere indices for use of a transparent two-phase photointerrupter GPIS30 (manufactured by Sharp Corp.). The numerical values should not necessarily be observed.

The output voltages A and B output from the transparent two-phase photointerrupter 21 are dephased mutually so that the output voltage B leads the output voltage A by $\pi/2$ radians. Since the output voltages are thus dephased, it becomes possible to detect a direction in-which the FPC board 20 moves. Based on the direction of the movement, a direction in which the lens holding frame 4 moves, that is, whether a zoom-in or zoom-out operation is under way can be detected.

Figure 12:
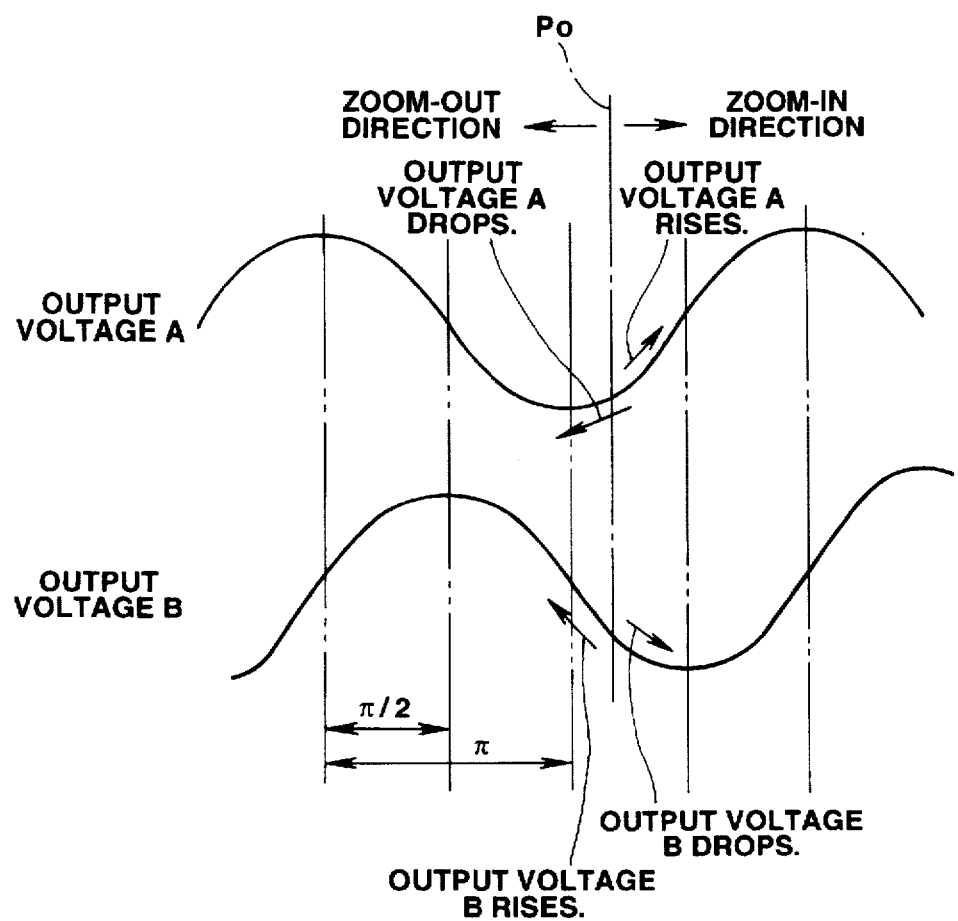
FIG. 12 is a diagram showing the waveforms of output voltages A and B of the photointerrupter in the camera shown in FIG. 9.

As shown in FIG. 12, for detecting a direction in which a stop point PO of the FPC board 20 moves, first, output voltages supplied relative to the stop point PO are converted into digital data. The digitized values are stored. Thereafter, zoom-in or zoom-out is carried out. This causes the FPC board 20 to advance or withdraw. The encoder pattern 20a alternately transmits or intercepts light emanating from or falling on the light emitter or light receivers of the transparent two-phase photointerrupter 21.

For example, immediately after zoom-in is started with the stop point PO as a reference point, the output voltage A increases while the output voltage B decreases. By contrast, immediately after zoom-out is started, the output voltage A decreases while the output voltage B increases. Thus, when the digitized values of both the output voltages obtained relative to the stop point PO are compared with the digitized values thereof obtained relative to a point succeeding the stop point PO, at least the presence of a change is detected. Thereafter, digitized values of both the output voltages obtained relative to a plurality of points preceding the stop point are stored and compared with digitized values thereof obtained relative to a point succeeding the stop point PO. Thus, the direction and magnitude of a movement can be detected accurately.

When the lens barrel itself is pushed or pulled by an external force, the FPC board 20 advances or withdraws slightly. The magnitude of the movement can be detected in the aforesaid manner.

Since one cycle ($2\pi$ radian) of each output voltage corresponds to one pitch of the encoder pattern 20a on the FPC board 20, for example, when a phase change of 2 radians of an output voltage corresponds to a change in position of 1 mm, if each output voltage is converted into 8-bit data, a change in position of 4 micrometers (1000 micrometers/256 steps) can be detected as a maximum resolution.

Digitized values of an output voltage obtained during one cycle can be converted to the magnitude of a movement corresponding to one pitch of the encoder pattern 20a and to the magnitudes of minor movements made during the movement by one pitch. When an output voltage is converted into digital data while every cycle thereof is detected with respect to any threshold voltage, the magnitude of a movement made by an FPC board can be detected more readily with higher accuracy.

When each output voltage approaches to a peak value, a phase change in the output voltage is moderate and therefore loses linearity. For example, when output voltage A reaches a peak value, a phase change in output voltage B leading output voltage A by $\pi/2$ radian which exhibits the best linearity is detected. This operation is performed alternately on voltages A and B every time each voltage reaches a peak value. If the phase of the photointerrupter increases to, for example, three, the phases of three voltages are shifted mutually by $\pi/3$ radians. This leads to improved linearity.

The influence of an external force upon the lens barrel poses a problem especially when a shift in position occurs due to a minor movement. For correcting the shift, as mentioned above, the movement of the FPC board 20 is detected all the time, and a change from a stop point with which zoom drive is completed immediately previously is converted immediately before or after the second release operation. The result of conversion is used as a correction value and taken into account in determining the number of pulses to be output to thrust the photography lens during driving of the photography lens.

If the encoder pattern is detected on a binary basis in units of one pitch or ½ pitch, zoom drive is carried out immediately after the second release operation so that the photography lens is moved to be zoomed in or out at least until the position signal of the incremental encoder shows a variation and then halted. The stop position is converted into the number of pulses to be output to thrust the photography lens during driving of the photography lens. Thus, a shift in position can be corrected reliably.

As mentioned above, the camera of the variant shown in FIG. 9 not only has the same advantage as the camera of the first embodiment but also can detect the position of the advanced or withdrawn lens holding frame 4 with high accuracy owing to the formation of the encoder pattern on the FPC board 20. Thus, a camera that is advantageous space-wise and cost-wise can be realized.

In the variant of the camera of the first embodiment shown in FIG. 9 and other drawings, the band-like FPC board 20 has the encoder pattern 20a, and the holding frame position meter for detecting the relative distance in the optical-axis direction of the lens holding frame 4 from the main unit is employed. Alternatively, the means for measuring the relative distance of a lens holding frame from a main unit is not limited to a band-like FPC board serving as a connection means.

For example, a variant in which a wire-like connection member is used as an electrical connection means for connecting a lens holding frame with a main unit can be proposed. Even in this variant, the wire-like connection member is taken up by a take-up reel of a take-up mechanism serving as a take-up means in the main unit. The relative distance of the lens holding frame from the main unit is detected by measuring the magnitude of a rotation made by the take-up reel.

In this variant adopting the wire-like connection member, not only the same advantage as the advantage of the camera of the first embodiment is provided but also a space required for connection can be reduced because the connection means is a wire-like connection member.

In the variant adopting the wire-like connection member, if a distal part of the wire-like connection member is fixed to a few substantially equidistant positions along the outer circumference of the lens holding frame 4, a backlash between the lens holding frame 4 and camera body can be made one-sided with the lens holding frame 4 kept not tilted.

The wire-like connection member also serves as an electrical connection means. A covered wire can be used. The connection member need not also serve as an electrical connection means. A wire member or band-like member can be adapted to a take-up mechanism for the purpose of position detection and backlash elimination.

Furthermore, a mechanism for taking up both a wire member and FPC board using a take-up reel of a take-up mechanism can be proposed as a variant.

FIG. 25 is an oblique view of a state in which a take-up mechanism of a variant adopting the wire-like connection member is mounted on a lens holding frame. In the drawing, a wire member 61 and FPC board 62 each have one of their ends thereof fixed to a lens barrel 60 and the other ends thereof fixed to a take-up reel 65. The take-up reel 65 is constrained to rotate by a built-in spiral spring or the like, and takes up the wire member 61 and FPC board 62 with the advancement or withdrawal of the lens barrel 60. The wire member 61 and FPC board 62 are guided by guide pins 63 and 64 along a take-up route. The magnitude of a rotation made by the rotary shaft of the take-up reel 65 is sensed by digitizing the output of a photointerrupter 67 (two-phase photointerrupter having a pitch of 0.6 micrometer) fixed to the shaft for detecting the rotation of an encoder disk 66.

A take-up force to be exerted for taking up the wire member and FPC board is received by the wire member 61 that is superior to the FPC board in terms of strength. The FPC board 62 is taken up without being tensed with slight looseness left.

Using the take-up mechanism of this variant shown in FIG. 25, reliability such as the accuracy in moving the FPC board 62 and the durability of the FPC board 62 improves.

In the camera of the variant of the first embodiment described in conjunction with FIG. 9, as previously mentioned, since the band-like FPC board 20 capable of detecting the relative distance of a lens holding frame from a main unit is adapted to a take-up mechanism, the position of the lens holding frame relative to an imaging plane can be detected accurately and the focus performance and imaging performance of the camera can be improved.

Herein, after the lens holding frame is moved to a given position as part of a normal power variation operation, an imaging operation, for example, a focus operation for moving only the lens holding frame 5 shown in FIG. 1 by a given magnitude is carried out. The shutter mechanism 13 is then actuated to carry out an exposure operation. Meanwhile, an external force may be applied to the lens holding frame 4, and the position of the lens holding frame 4 may be changed by some or all of backlash present in the structure of the lens barrel. This change will be discussed below.

To begin with, in the camera of the variant of the first embodiment shown in FIG. 9, the relative distance in the optical-axis direction of the lens holding frame 4 from the imaging plane 18 can be detected directly. After the completion of a power variation operation, if an operation for finding the position of the lens holding frame 4 is carried out continually until an exposure operation is started, a focus operation is achieved on the basis of the position information. Even in an abnormal use state in which an external force is applied to the camera, an accurate focus operation can be ensured. However, this control system is not preferable from the viewpoint of power saving because the operation for finding the position of the moved lens holding frame must be continued for a prolonged period of time.

A camera, in which after the power variation operation is completed, a shift in position of the lens holding frame 4 occurring in the abnormal use state in which an external force is applied to the camera can be detected and corrected, is proposed as a camera of another variant of the first embodiment. The camera of the another variant will be described in conjunction with FIGS. 13A, 13B, and 13C that are the charts showing states in which different points of the encoder pattern on an FPC board are detected according to how a lens holding frame is actuated.

Figure 13A:
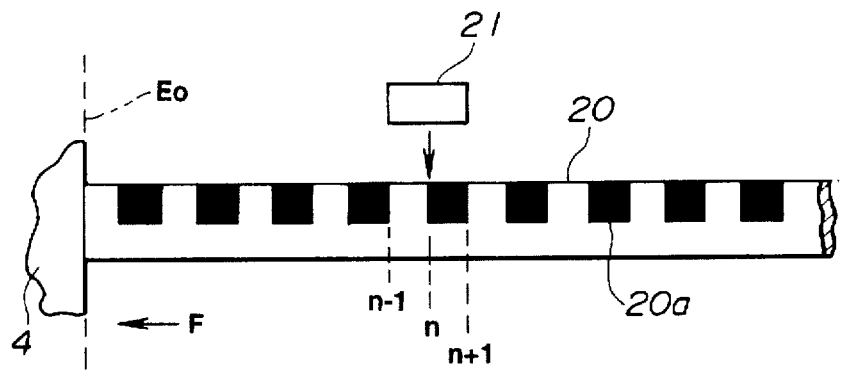
FIG. 13A shows the relative position of an FPC board in relation to a photointerrupter in another variant of the camera shown in FIG. 1, illustrating the relative state of an encoder pattern on the FPC board in relation to the photointerrupter at a certain position at which the lens holding frame is actuated.

In the camera of this variant adopting an FPC board shown in FIG. 13A and others, after a power variation operation is completed, the operation of the holding frame position meter for detecting the relative distance of the lens holding frame 4 from a main unit is stopped for the purpose of power saving in the camera.

In the camera of this variant adopting the FPC board shown in FIG. 13A and others, when a release switch is manipulated, the holding frame position meter is actuated before the start of an imaging operation such as a focus operation and exposure operation. At the same time, the lens holding frame 4 is moved in the same direction as a direction in which an zoom operation is carried out immediately previously (from a telephoto-mode position to a wide-angle mode position or vice versa). When the encoder position signal of the photointerrupter 21 included in the position meter makes a variation, the position meter stops operating.

The time that the position signal makes a variation is the time that the output signal of the photointerrupter 21 makes an ON-to-OFF transition with the photointerrupter 21 set at the border between black and white parts of the encoder pattern 20a. The output signal of the photointerrupter 21 makes the ON-to-OFF transition when the relative position of the lens holding frame 4 in relation to the main unit 14 is changed by a magnitude corresponding to a unit width of the pattern that is the width of a black or white part of the encoder pattern 20a. Herein, the unit width of the pattern is a half of one pitch of the pattern 20a.

Assume that as shown in FIG. 13A, after the lens holding frame 4 is moved in an F direction, when a power variation operation is completed, the end surface of the lens holding frame 4 is located at position EO and the photointerrupter 21 stops operating in face of the n-th encoder pulse point.

Figure 13B:
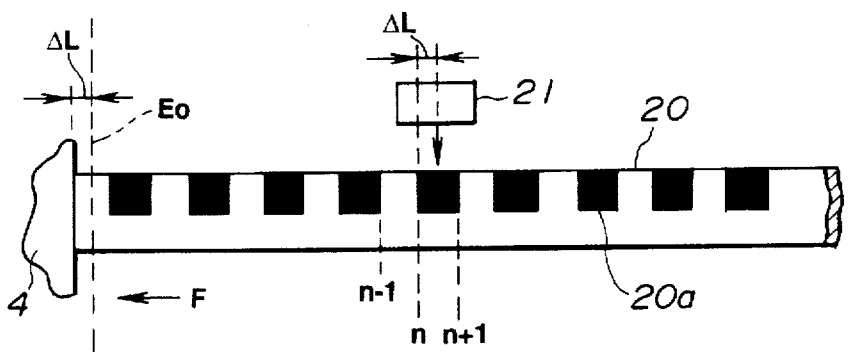
FIG. 13B shows the relative position of the FPC board in relation to the photointerrupter in the variant shown in FIG. 13A, illustrating the relative state of the encoder pattern on the FPC board in relation to the photointerrupter at another position at which the lens holding frame is actuated.
Figure 13C:
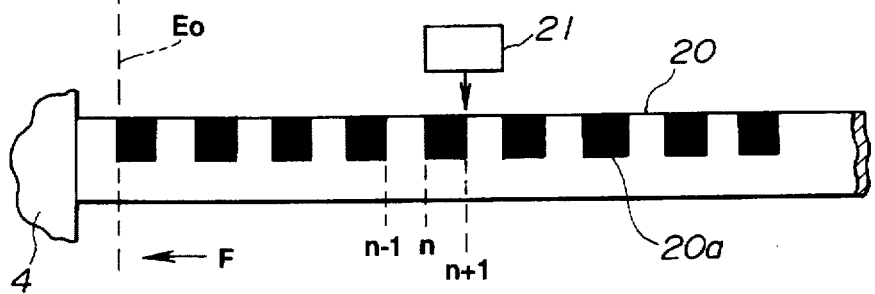
FIG. 13C shows the relative position of the FPC board in relation to the photointerrupter in the variant shown in FIG.

Assume that an external force works on the camera, and the lens holding frame 4 moves by a distance ΔL as shown in FIG. 13B. In the state set after the completion of a power variation operation, backlashes are pushed aside in the F direction in which the power variation operation is carried out. As shown in FIG. 13B, despite the external force, a shift in position of the lens holding frame 4 occurs only in the F direction corresponding to the direction of power variation.

Before photography is started, a power variation operation is carried out in the same direction as the F direction. The lens holding frame 4 is halted with the photointerrupter 21 facing the n+1-th point of the encoder pattern 20a which causes the output signal of the photointerrupter 21 to make a variation. The camera carries out focus and photography-with the lens holding frame 4 halted with the photointerrupter 21 facing the n+1-th stop point.

Owing to the foregoing operation, when an external force is applied to the camera after the completion of a power variation operation, even if the position in the optical-axis direction of the lens holding frame 4 is shifted by backlash existent in the structure of the lens barrel, since measurement of the relative position of the lens holding frame 4 in relation to the main unit is resumed, a focus operation can be carried out on the basis of the position information. This results in excellent imaging performance.

However, in this case, the unit width of the encoder pattern must be set larger than a magnitude by which the position of the lens holding frame changes due to an external force.

This is because when the total magnitude of backlash is equal to or larger than the unit width of the encoder pattern 20a, the lens holding frame 4 may move by this magnitude. In this case, even if the photography lens is re-driven to be zoomed in or out and halted when the encoder position signal makes a variation, it becomes impossible to definitely detect by how many unit widths of the encoder pattern, say one unit width or two, the lens holding frame 4 has been shifted since the completion of the zoom operation. For detecting the position of the lens holding frame at the completion of the zoom operation, a method for sensing the position thereof by counting the number of encoder pulses output after a reference point of the encoder pattern is moved is known as a prior art.

As a solution of the drawback underlying the variant described in conjunction with FIG. 13A, yet another variant of the camera of the first embodiment will be described in conjunction with FIG. 14.

In the variant described in conjunction with FIG. 13A, the width of one part of the encoder pattern included in the lens holding frame position meter for detecting the relative distance of the lens holding frame 4 from the main unit 14 must be set larger than the magnitude of a movement made by the lens holding frame 4 due to an external force, that is, the total magnitude of backlash.

By contrast, in the camera of the variant shown in FIG. 14, the pattern unit width that is the pattern pitch can be made finer, and therefore the accuracy in position detection can be improved. Even if the backlash of a lens holding frame is large, the pattern with the finer unit width can be adapted.

Unlike the camera of the variant shown in FIG. 9, the camera of this variant includes, as shown in the longitudinal sectional view of FIG. 14, a zoom motor encoder 19 capable of detecting the magnitude of a rotation made by a zoom drive motor 12.

In the camera of the variant shown in FIG. 14, when a power variation operation is completed, backlash existent in the structure of the lens barrel are, needless to say, one-sided in a direction in which drive is carried out. However, when the position of the lens holding frame is changed because of an external force, if a power variation operation is carried out in the same direction as an immediately preceding operation prior to an imaging operation, the zoom drive motor 12 is driven, and the zoom motor encoder 19 outputs a signal. However, the lens holding frame 4 does not move.

In other words, when the backlash existent in the driving force conveyer system and in the frame structure are one-sided in the direction in which drive is carried out, if the motor is driven, the lens holding frame A4 moves simultaneously. However, when the lens holding frame A is moved by an external force, if the backlash are not one-sided, the motor may be driven but the lens holding frame does not move beyond the backlash.

This means that there is a period during which no encoder signal is output from the photointerrupter 21 included in the position meter. In the variant shown in FIG. 14, pulses output from the zoom motor encoder 19 during the period are counted in order to sense the magnitude of a change in position of the lens holding frame due to an external force.

Next, a camera that is an imaging apparatus of the second embodiment of the present invention will be described. However, the camera of this embodiment is substantially identical to the camera of the first embodiment except the band-like FPC board take-up mechanism. The components of the camera itself are the same as those shown in FIG. 1.

FIG. 15 shows an FPC board take-up mechanism 37 serving as a take-up means incorporated in the camera of this embodiment, and is a cross sectional view of a state in which a band-like FPC board 30 serving as a connection means is pulled out. FIG. 16 shows a 16—16 section of FIG. 15.

In the FPC board take-up mechanism 37, a take-up reel 37b is supported by a center fixing shaft 37a fixed to a support 37d locked in the camera body 14 so that the take-up reel 37b can rotate freely. An end 31b of a constant force spiral spring 31 serving as a constraining means is fitted on the lateral side of a notch 37b1 on the outer circumference of the take-up reel 37b.

The band-like FPC board 30 is affixed to the surface of the constant force spiral spring 31 in one united body. One end of the FPC board 30 on the side of the camera body is temporarily locked by the end 31b of the constant force spiral spring 31. The FPC board 30 is further extended, routed from the outer circumference of the take-up reel 37b to the inner circumference thereof through the notch 37b1 of the take-up reel 37b, and wound loosely about the center fixing shaft 37a by a given number of turns in a space between the inner circumference of the take-up reel 37b and the center locking shaft 37a. The end 30b of the FPC board is then fixed to the center fixing shaft 37a.

The other ends of the constant force spiral spring 31c and FPC board 30 are fixed to the lens holding frame 4. With a wind-back force of the constant force spiral spring 31, the constant force spiral spring 31 and FPC board 30 are retained in a tensed state without any looseness between the lens holding frame 4 and take-up reel 37b.

When the photography lens is set at a telephoto zoom-mode position, the FPC board 30 shown in FIG. 15 is pulled out to the greatest extent. When the power of the photography lens is varied and the photography lens is set at a wide-angle zoom-mode position, the lens holding frame 4 is plunged into the camera body 14. The FPC board 30 is taken up by the FPC board take-up mechanism 37 by a length corresponding to the magnitude of the movement.

With the rotation of the take-up reel 37b, the end 31b of the constant force spiral spring 31 and the center fixing shaft 37a, by which the FPC board 30 is temporarily locked and fixed, rotate. The FPC board 30 wound in the space between the inner circumference of the take-up reel 37b and the outer circumference of the center fixing shaft 37a changes from a loosely-wound state to a tightly-wound state. An excess tension does not therefore work on the FPC board 30.

FIG. 17 shows a state in which the take-up reel 37b takes up the FPC board 30, which has been in the state shown in FIG. 15, clockwise by one turn.

The connected state of the FPC board take-up mechanism 37 to the electrical printed-circuit board 39 in the camera body is shown in the oblique view of FIG. 18.

In the FPC board take-up mechanism 37, the take-up reel 37b rotates according to a change in distance of the lens holding frame 4 from the camera body deriving from power variation, and thus takes up or feeds the FPC board 30. The end 30b of the FPC board 30 on the side of the camera body should merely be fixed to the center fixing shaft 37a locked in the camera body. Consequently, as shown in FIG. 18, the tip of the FPC board 30 attached and fixed to the center fixing shaft 37a can be further extended and linked to the electrical printed-circuit board 39 in the camera body.

As mentioned above, using the FPC board take-up mechanism 37 incorporated in the camera of this embodiment, not only the same advantage as the advantage of the first embodiment can be provided but also the FPC board 30 can be taken up stably because the constraining force exerted by the constant force spiral spring 31 for taking up the FPC board does not vary very greatly. Moreover, the FPC board 30 need not slide on the outer circumference of the take-up reel 37b when taken up, the loss of the constraining force for taking up the FPC board is limited and the durability of the FPC board is improved.

For attaching the FPC board 30 to the constant force spiral spring 31, in this embodiment, the FPC board 30 is affixed to the constant force spiral spring. Alternatively, the whole surface of the FPC board 30 may not be affixed but one end thereof may be affixed and the other end thereof may be constrained to adhere to the constant force spiral spring 31 so that the FPC board will not loosen. The FPC board 30 and constant force spiral spring 31 will therefore not sag. Take-up can be achieved more successfully.

The spiral spring 17c adapted to the first embodiment may be used as a take-up constraining means in place of the constant force spiral spring 31 in order to apply a constraining force for constraining the take-up reel to rotate to the take-up reel 37b. In this case, the FPC board 30 is temporarily locked in the notch 37b1 of the take-up reel and then has the end 30b fixed to the fixing shaft 37a.

In this embodiment, the structure for connecting the FPC board 30 with the electrical printed-circuit board 39 in the camera body is such that the FPC board 30 is wound loosely by a given number of turns within the take-up reel 37b in order to absorb the magnitude of a rotation to be made by the take-up reel 37b, and thus the end 30b of the FPC board 30 is brought to a fixed and supported state. Alternatively, the FPC board may not be wound within the take-up reel, but a slider chip may be attached to the lateral side of the take-up reel 37b so that the end 30b of the FPC board that rotates together with the take-up reel 37b can be electrically connected to the electrical printed-circuit board 39 in the camera body via the slider chip.

Next, a camera that is an imaging apparatus of the third embodiment of the present invention will be described. The camera of this embodiment is substantially identical to the camera of the first embodiment except for the band-like FPC board take-up mechanism. The components of the camera itself are identical to those shown in FIG. 1.

FIGS. 19 and 21 are cross sectional views of an FPC board take-up mechanism 47 incorporated in the camera of this embodiment. FIG. 20 shows a 20—20 section of FIG. 19.

The FPC board take-up mechanism 47 that is a take-up means in the camera of this embodiment adopts, unlike the take-up mechanism 37 adapted to the camera of the second embodiment shown in FIG. 15, a spiral spring 41 as a constraining means for taking up an FPC board as shown in FIG. 19 and others. A band-like FPC board 40 serving as a connection means is affixed to the surface of the spiral spring 41 in one united body. The spiral spring 41 and FPC board 40 are, as shown in FIGS. 19 and 20, pulled in or thrust from a case 47d locked in and supported by the camera body. The end 41b of the spiral spring 41 and an end of the FPC board 40 are fixed to a center fixing shaft 47a locked in the case 47d.

FIG. 19 shows a state in which the band-like FPC board 40 is pulled out to the greatest extent. In this state, the spiral spring 41 is tightly wound about the center fixing shaft 47a by a given magnitude in order to ensure a take-up force of a certain level or more.

FIG. 21 shows a state in which the FPC board 40 that has been in the state shown in FIG. 19 is taken up by a given magnitude. The spiral spring 41 is unwound in a space between the outer circumference of the center fixing shaft 47a and the inner circumference of the case 47d, and still maintains a given take-up force.

Using the FPC board take-up mechanism 47 in the camera of this embodiment having the foregoing structure, a steady tension is provided by the spiral spring 41 that is stowed in the case 47d despite the pulling or winding of the FPC board 40. When the fixed part of the FPC board 40 is further extended from the center fixing shaft 47a, connection with the electrical printed-circuit board in the camera body can be attained readily.

Next, a camera that is an imaging apparatus of the fourth embodiment of the present invention will be described. The camera of this embodiment is substantially identical to the camera of the first embodiment except for the band-like FPC board take-up mechanism. The components of the camera itself are identical to those shown in FIG. 1.

FIGS. 22 and 24 are cross sectional views of an FPC board take-up mechanism incorporated in the camera of this embodiment. FIG. 23 shows a 23—23 section of FIG. 22.

An FPC board take-up mechanism 57 serving as a take-up means to be adapted to the camera of this embodiment is, like the take-up mechanism 37 adapted to the second embodiment, a mechanism for taking up a band-like FPC board 50 serving as a connection means by means of a take-up reel supported freely rotatably by a center fixing shaft 57a locked in the camera body. However, instead of using a constant force spiral spring to exert a take-up force, a spiral spring 57c serving as a constraining means and lying between the center fixing shaft 57a and take-up reel 57b is used to exert a take-up force. One end of the FPC board 50 is fixed to the outer circumference of the take-up reel 57b.

FIG. 22 shows a state in which the lens holding frame 4 is thrust and the FPC board 50 is pulled out. In this state, if the lens holding frame 4 is plunged into the camera body, the spiral spring 57c is unwound inside the take-up reel 57b as shown in FIG. 24. The FPC board 50 is wound about the outer circumference of the take-up reel 57b.

In the FPC board take-up mechanism 57, unlike the take-up mechanism 37 adapted to the second embodiment, the band-like FPC board 50 need not be affixed to a constant force spiral spring. This results in easy assembling. Moreover, more freedom is ensured in determining the route of the FPC board 50.

Incidentally, the encoder pattern adapted to the variant of the first embodiment may be inscribed on the constant force spiral spring or the thin blade spring that is the spiral spring, which serves as a take-up spring means, adapted to the take-up mechanism in the camera of the second embodiment shown in FIG. 15 or of the third embodiment shown in FIG. 19 by performing etching, printing, or the like, so that the relative distance of the lens holding frame from the camera body can be detected.

Furthermore, a magnetic tape on which a magnetic pattern is formed may be substituted for the FPC board serving as a connection means. In this case, the relative position of the lens holding frame in relation to the main unit is read using a magnetic sensor. This constitution enables relatively inexpensive high-resolution position detection.

What is claimed is:

1. An imaging apparatus, comprising:

a main unit;

a lens holding frame freely movable in an optical-axis direction relative to said main unit;

elongated connection means for connecting said main unit with said lens holding frame;

a take-up means including a winding member for taking up said connection means by wrapping said connection means about said winding member so that only one thickness of the connection means is wrapped about the winding member, thus eliminating looseness; and a constraining means for constraining said take-up means to normally move in a direction in which said connection means is taken up.

2. An imaging apparatus according to claim 1, wherein said take-up means is constantly constrained by said constraining means to clear backlash present in a mechanism arranged between said main unit and said lens holding frame.

3. An imaging apparatus according to claim 1, wherein said take-up means includes a take-up shaft for taking up said connection means.

4. An imaging apparatus according to claim 1, wherein said connection means is formed with an electrical connection member having relatively weak bending elasticity and electrically connecting said main unit with said lens holding frame.

5. An imaging apparatus according to claim 1, wherein said connection means is formed with a flexible printed-circuit board.

6. An imaging apparatus according to claim 4 or 5, wherein said connection means electrically connects a driving means included in said lens holding frame with said main unit.

7. An imaging apparatus according to claim 4 or 5, wherein said connection means electrically connects a position detecting means included in said lens holding frame with said main unit.

8. An imaging apparatus according to claim 4 or 5, wherein said connection means electrically connects electrical elements included in said lens holding frame with an electrical printed-circuit board located on the margin of said main unit.

9. An imaging apparatus according to claim 4 or 5, wherein said connection means electrically connects electrical elements included in said lens holding frame with an electrical printed-circuit board included in said main unit.

10. An imaging apparatus according to claim 6, 7, or 8, wherein said take-up means takes up said connection means by working on an intermediate point of said connection means.

11. An imaging apparatus according to claim 10, wherein one end of said connection means is fixed to said main unit.

12. An imaging apparatus according to claim 11, wherein one end of said connection means is fixed to an electrical printed-circuit board in said main unit.

13. An imaging apparatus comprising:
a main unit;
a lens holding frame freely movable in an optical-axis direction relative to said main unit;
a connection means for connecting said main unit with said lens holding frame;
a take-up means for taking up said connection means and thus eliminating looseness;
a constraining means for constraining said take-up means to move in a direction in which said connection means is taken up; and
said connection means includes a detection means for detecting a relative distance, measured in the optical-axis direction, of said lens holding frame from said main unit.

14. An imaging apparatus according to claim 13, wherein said detection means is an encoder for detecting a taken-up state of said connection means.

15. An imaging apparatus according to claim 1, further comprising guide means, located between said main unit and lens holding frame, for defining and controlling a route of said connection means.

16. An imaging apparatus according to claim 1, further comprising a distance detection means for detecting a relative distance, measured in the optical-axis directions, of said lens holding frame from said main unit.

17. An imaging apparatus according to claim 16, wherein for an imaging operation, first, said lens holding frame is advanced or withdrawn relative to said main unit by a drive means until a detection signal output from said distance detection means makes a variation, and then the imaging operation is carried out continuously by control means based on distance information.

18. An imaging apparatus, comprising:
a main unit;
a lens holding frame freely movable in an optical-axis direction relative to said main unit;
a control circuit included in said main unit;
electrical parts being arranged in said lens holding frame;
a connection means, placed to extend in the optical axis direction, for electrically connecting said control circuit with said electrical parts;
a detection pattern formed on at least one end of at least one side of said connection means; and
a detection means for detecting a magnitude of a movement made parallel to the optical-axis direction by said connection means based on said detection pattern.

19. An imaging apparatus according to claim 18, further-comprising a take-up means for taking up said connection means and thus eliminating looseness, and a constraining means for always constraining said take-up means to move in a direction in which said connection means is taken up.

20. An imaging apparatus according to claim 18, wherein said detection pattern is an optical pattern, and said detection means is an optical reading means.

21. An imaging apparatus according to claim 18, wherein said detection pattern is shaped like comb teeth so that transmission and non transmission are repeated optically alternately.

22. An imaging apparatus according to claim 21, wherein the comb teeth on said detection pattern are arranged equidistantly.

23. An imaging apparatus according to claim 18, wherein said detection pattern is composed of slits so that reflection and non reflection are repeated optically alternately.

24. An imaging apparatus according to claim 23, wherein the slits of said detection pattern are arranged equidistantly.

25. An imaging apparatus according to claim 18, wherein said detection pattern is formed by printing or etching an electrically conductive pattern on the surface of said connection means.

26. An imaging apparatus according to claim 18, wherein a magnitude of a movement made in the optical-axis direction by said connection means and the direction in which the movement is made are detected continually or intermittently until a movement operation is restarted after the movement of said lens holding frame relative to said main unit is halted.

27. An imaging apparatus according to claim 20, wherein said detection means is a two-phase optical detection means for outputting at least two electrical signals.

28. An imaging apparatus according to claim 27, wherein position detection is carried out by utilizing one of said signals that are out of phase by $\pi/n$ radian (where n denotes the phase of the detection means) which is making a phase change with the best linearity.

29. An imaging apparatus according to claim 1 wherein one end of said connection means is arranged within an interior of said winding member and is maintained stationary thereat.

30. An imaging apparatus according to claim 1 wherein the winding member rotates about a fixed shaft and an end of said connection member is arranged internally of said winding member and is secured to said fixed shaft.

31. An imaging apparatus according to claim 1 wherein said connection means comprises a flexible printed circuit board and a wire extending between said main unit and said lens holding frame, both said flexible printed circuit and said wire being wrapped about said winding member.

32. An imaging apparatus according to claim 1 wherein said winding member has a hollow interior and a gap about a periphery thereof, one end of said connection means extending through said gap and being fixed at a location near an axis of rotation of said winding member.

33. An imaging apparatus according to claim 1 wherein said connection means comprises a flexible printed circuit and a spring member extending between said lens holding frame and said winding member and being wrapped about said winding member.

34. An imaging apparatus according to claim 1 wherein said connection means is a flexible printed circuit having one end located within an interior of said winding member and being fixedly mounted thereat; and a portion of said flexible printed circuit one end extending in a direction parallel to an axis of rotation of said winding member and extending away from said winding member for a connection to electrical components in said main unit.

35. An imaging apparatus according to claim 1 wherein said winding member is displaced from a path of movement of said lens holding frame; and guide means arranged intermediate opposing ends of said connection means for guiding said connection means between said lens holding frame and said winding member to align said connection means so that said connection means does not interfere with movement of said lens holding frame.

\* \* \* \* \*

UNITED STATES PATENT AND TRADEMARK OFFICE
CERTIFICATE OF CORRECTION

PATENT NO. : 5,758,208
DATED : May 26, 1998
INVENTOR(S) : Fujii et al.

It is certified that error appears in the above-identified patent and that said Letters Patent is hereby corrected as shown below:

Col. 1, line 39, delete "connect" and insert --connects--.

Col. 9, line 23, delete "fame" and insert --frame--.

Col. 11, line 65, delete "to".

Col. 12, line 63, delete "not" and insert --from being--.

Col. 15, line 46, delete "A4" and insert --4--.

Col. 15, line 47, delete "A" and insert --4--.

Signed and Sealed this

Seventeenth Day of August, 1999

Attest:

Q. TODD DICKINSON

*Attesting Officer*          *Acting Commissioner of Patents and Trademarks*